Feb. 7, 1967     W. F. SMITH     3,302,898
WINDING AND FEEDING DEVICE
Filed Oct. 15, 1964
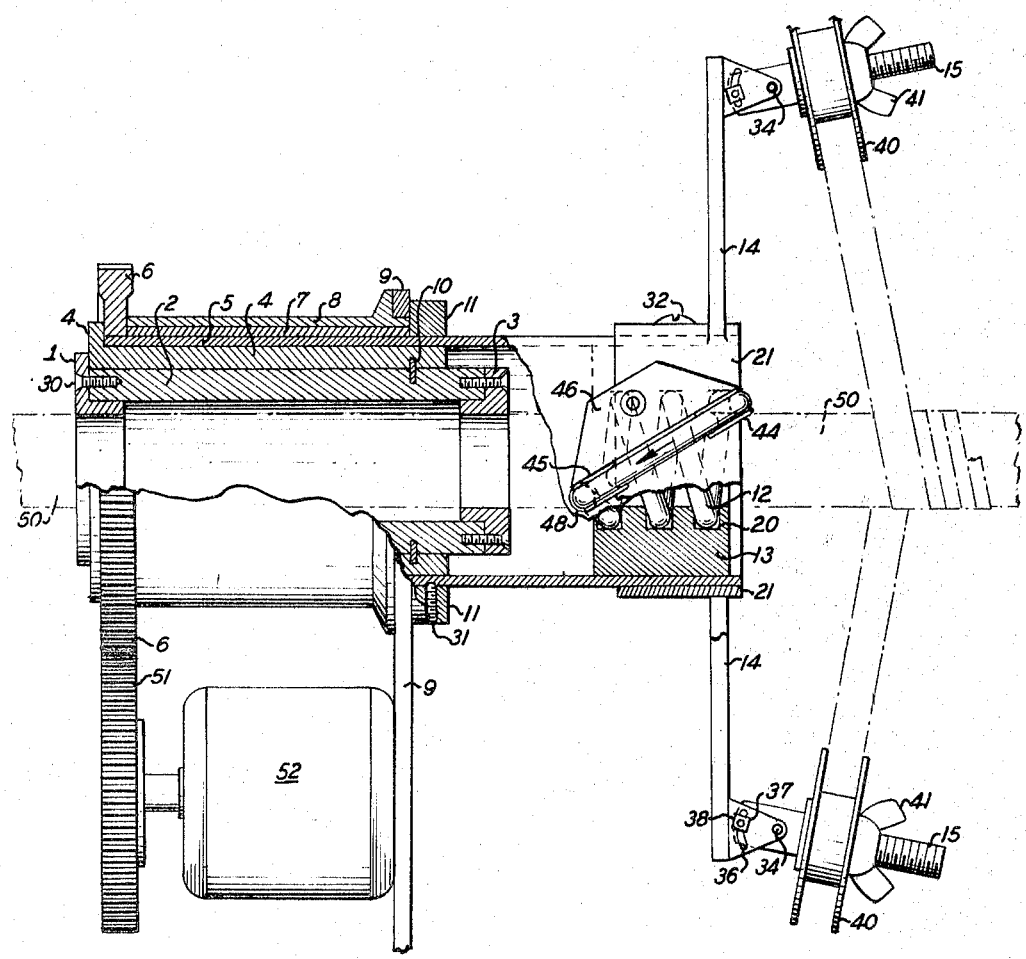
INVENTOR
WILLIAM F. SMITH
BY Mason, Mason & Albright
ATTORNEYS 3,302,898
WINDING AND FEEDING DEVICE
William Franklin Smith, 338 E. Fairview Road,
Oak Ridge, Tenn. 37830
Filed Oct. 15, 1964, Ser. No. 404,029
6 Claims. (Cl. 242—11)

This invention relates to a tape winding device. More particularly, this invention relates to a device for turning and simultaneously moving an elongated body past a tape dispenser, the later being adapted to pay out tape that is being wrapped around the moving elongated body.

The figure of the drawings is a side elevational view, partly broken away, of the invention. Shown in phantom are the tapes and the shaft around which they are wrapped.

Referring to the drawing, the taping device comprises a rotatable holder having a guide 1 positioned at the entrance and secured to hollow sleeve 2 by means of screws 30. At the opposite end of sleeve 2, a second guide 3 is similarly secured. These guides have holes that conform in cross section with the workpiece and can be square, triangular, circular, or any other configuration. A bearing 4 tightly encircles and rotates with sleeve 2 and is forced into abutment with guide 1 by a split washer 10.

A circular gear 6 is secured to bearing 4 to rotate same within inner housing 5, the latter being held stationary within bearing 7 as gear 6 is turned. Retaining ring 11 positions bearing 7 and outer housing 8 relative to a motor mounting bracket 9. Screw 31 bears on inner housing 5 to secure the motor mount and housing 8 relative to housing 5.

At the exit of the device and held stationary within housing 5, is a gear element 13 having a spiral depression or groove in its inner surface into which an endless member 12 is threaded. A tape supporting bracket 14 is mounted on sleeve 21 held on housing 5 with set screw 32.

Bracket 14 mounts at least one tape holder preferably in the form of a threaded bolt 15 pivoted at 34 intermediate its ends. The end opposite the threaded end is fitted in a bifurcated part of the bracket 14 and retainable in a plurality of settings about pivot 34. The same end of bolt 15 has a threaded screw 38 which is projected through slot 36 and is retainable therein by means of a nut 37. A tape reel 40 is mounted on the collar portion of bolt 15 and held in place with a wing nut 41. The reel can be angled with respect to the exit by loosening nut 37 and pivoting bolt 15 about pivot 34. A preferred arrangement is to mount two reels on opposite sides of the exit and angle each reel so that the desired spacing between convolutions is achieved. However, it will be appreciated that one or more than two tape dispensing means can be used depending on the effect desired. Also, it is to be understood that the tape dispensing means can be in the form of wire on spools and other winding and unwinding equivalents will occur to those skilled in the art.

A pulley member 44 having one or more sheaves 45 is mounted on the collar portion 21 of bracket 14 by means of clamp 46. Endless member 12 is guided around gear element 13, entering hole 48 in sleeve 5, traveled through groove 20 and out the exit to the pulley member 44.

In operation, an elongated body such as workpiece 50 of rectangular cross section is inserted through guides 1 and 3. Motor 52 is turned on to rotate spur gear 51 and gear 6. The workpiece thus rotated by guides 1 and 3 is then pushed manually until engagement by endless member 12. The rotation of workpiece 50 in friction engagement with endless member 12 causes the member to travel through depression or groove 20. As member 12 travels it draws the workpiece in the entrance and urges same out the exit of the device.

Once the elongated workpiece emerges, the motor can be stopped until one or more tapes are secured at one end of the workpiece and the motor started again. By positioning the tape reels 40 at the desired angle relative to the exit, the tape can be wound in spaced convolutions about the workpiece.

The above description and drawings disclosed a single embodiment of the invention, and specific language has been employed in describing the figure. It will, nevertheless, be understood that no limitations of the scope of the invention are thereby contemplated, and that various alterations and modifications may be made such as would occur to one skilled in the art to which the invention relates.

I claim:

1. A taping device comprising a rotatable channeled holder having an entrance and an exit, said holder including a hollow gear element at the exit thereof, said gear element having an inner surface with a spiral depression therein, an endless member threaded in said depression for receiving an elongated workpiece in friction engagement, means for rotating said elongated workpiece to travel said endless member through the depression whereby the workpiece is drawn in the entrance and urged out the exit, tape dispensing means supported adjacent said exit for paying out tape as the tape is wound about said rotating workpiece.

2. The invention of claim 1 wherein the tape dispensing means is pivotably supported on a bracket whereby the tape can be dispensed from a plurality of settings.

3. The invention of claim 2 wherein locking means is provided to retain said tape dispensing means in an angled position relative to the exit of the holder.

4. The invention of claim 1 wherein the tape dispensing means is a pair of tape reels, said reels being supported on opposite sides of the exit.

5. The invention of claim 1 wherein a pulley member is secured adjacent the holder to guide said endless member around said gear element.

6. The invention of claim 1 wherein the holder includes a sleeve at the entrance and guide members at each end of the sleeve.

References Cited by the Examiner
UNITED STATES PATENTS 2,174,754 10/1939 Miller _____ 242—11
2,785,700 3/1957 Yovanovich _____ 156—195 X
3,155,559 11/1964 Hall _____ 57—11 X FRANK J. COHEN, Primary Examiner.
B. S. TAYLOR, Assistant Examiner.